F. B. PERRY.
Pocket Knife.

No. 71,211.

Patented Nov. 19, 1867.

Witnesses:
D. W. Bond
H. H. Bond.

Inventor:
Franklin B. Perry

United States Patent Office.

FRANKLIN B. PERRY, OF NORTHAMPTON, MASSACHUSETTS.

Letters Patent No. 71,211, dated November 19, 1867.

IMPROVEMENT IN POCKET CUTLERY.

*The Schedule referred to in these Letters Patent and making part of the same.*

TO ALL WHOM IT MAY CONCERN:

Be it known that I, FRANKLIN B. PERRY, of the town of Northampton, in the county of Hampshire, and Commonwealth of Massachusetts, have invented a new and useful Improvement in the Manufacture of Pocket-Knives. The following is a full, clear, and exact description of the same, reference being had to the accompanying drawing.

The nature of my invention consists in connecting the two pieces of metal on the sides of the handle, and through which the rivet is placed which holds the blade of the knife to the handle in its proper position, by means of a bar attached to said pieces, and crossing from one to the other by means of a spring in the knife-handle, thereby making the handle strong at its weakest point, and preventing the blade from working loose in the handle, as is the case in all knives made in the ordinary manner after a little use, where there is nothing but the rivet to hold it in place.

In order to enable others to make my invention, I proceed to describe its construction.

In the drawings hereto annexed, and making part of this specification—

In the accompanying drawing the same letters are used to represent the same parts of the knife in the different figures.

Figure 1:
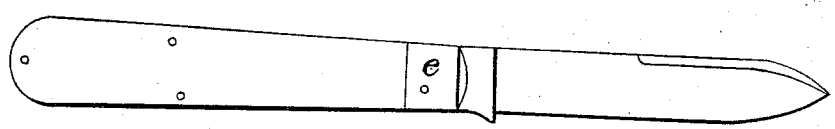
Figure 1 represents a side view of the knife when open.
Figure 2:
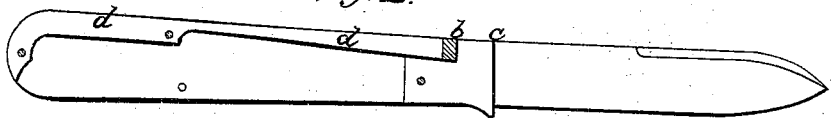
Figure 2 represents a side view of the knife when open, with one side of the handle removed.
Figure 3:
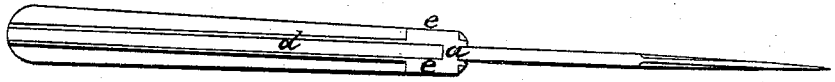
Figure 3 represents the back of the knife when open.

$d$ represents the spring of the knife, and is made of the same length and shape as those in ordinary knives. $a$ represents the size and position of the bar above referred to. $b$ and $c$ represent points of the blade when made as in ordinary knives, between which it must be cut away to allow the knife to open to its proper position when the bar $a$ has been inserted. $e\ e$ represent the sides of the handle, sometimes called "cheeks," to which the bar $a$ is fastened, and through which the rivet passes which holds the blade of the knife in its position.

To construct a knife with my improvement, the blade and cheeks must be cut away at the point where the bar is to be placed sufficiently to allow the bar to be located, and then the bar is secured to the cheeks of the handle either by pins or by brazing it to them, or by both pins and brazing. Or the cheeks and the bar may be cast or made in one solid piece, which, it is believed, is the best method of making them. The remaining parts of the knife are made in the same manner as corresponding parts in ordinary knives.

Having described the nature of my invention, and the method of constructing a knife with the same, what I claim as my invention, and desire to secure by Letters Patent, is—

The making of a knife in which the cheeks or sides of the handle through which the rivet is placed which holds the blade are united together by means of a bar secured to them in the manner and at the same position as above described.

FRANKLIN B. PERRY.

Witnesses:
D. W. BOND,
H. H. BOND.